UNITED STATES PATENT OFFICE.

BÄR ADLER, OF SAN FRANCISCO, CALIFORNIA.

IMPROVEMENT IN BUILDING AND PAVING BRICKS.

Specification forming part of Letters Patent No. 150,666, dated May 12, 1874; application filed April 15, 1874.

*To all whom it may concern:*

Be it known that I, BÄR ADLER, of San Francisco city and county, State of California, have invented a Compound Brick for Building and Paving; and I do hereby declare the following description and accompanying drawings are sufficient to enable any person skilled in the art or science to which it most nearly appertains to make and use my said invention without further invention or experiment.

The object of my invention is to provide an improved brick or block for the purposes of building and paving, as may be desired; and it consists in a combination of clay and asphaltum in certain proportions, well mixed, which mass is afterward molded into suitable forms, and dried, and burned. The bricks are also boiled in coal-tar and asphaltum either before or after being burned, thus toughening and hardening them.

I am aware that ordinary clay bricks have been treated with a coating of coal-tar to fit them for paving purposes; but my invention contemplates the employment of a brick of different material.

To make my brick, I employ any suitable clay, which is ground and otherwise prepared, after which it has added to it about one-fourth part of asphaltum. These component parts are then intimately mixed and formed into blocks of suitable shape, which are dried. After being well dried they are immersed in a kettle or other receptacle filled with a mixture of asphaltum and coal-tar, and boiled therein for about ten hours, so as to thoroughly saturate them. If preferred, this boiling may be deferred until after the brick have been burned.

By this construction I am enabled to produce a brick or block which will be very hard and durable, and will sustain the heaviest loads without breaking or crushing.

In some instances the proportion of asphaltum may be varied with advantage.

When my block is to be employed for paving purposes it will be first necessary to prepare a bed of pulverized rock or sand and cement mixed with water, which is first laid and allowed to harden, after which the blocks can be laid in the usual manner, the whole forming a durable pavement.

Having thus described my invention, what I claim, and desire to secure by Letters Patent, is—

A building or paving block composed of a mixture of clay and asphaltum, dried and treated by boiling, substantially as and for the purpose above described.

In witness whereof I hereunto set my hand and seal.

BÄR ADLER. [L. S.]

Witnesses:
JOHN L. BOONE,
C. M. RICHARDSON.